(12) United States Patent
Su et al.

(10) Patent No.: US 11,364,895 B2
(45) Date of Patent: Jun. 21, 2022

(54) YAW MOTION CONTROL METHOD FOR FOUR-WHEEL DISTRIBUTED VEHICLE

(71) Applicant: Xiamen King Long United Automotive Industry Co., Ltd., Xiamen (CN)

(72) Inventors: Liang Su, Xiamen (CN); Lu Xiong, Xiamen (CN); Zhiwei Liu, Xiamen (CN); Bo Leng, Xiamen (CN); Gang Gong, Xiamen (CN); Guangji Song, Xiamen (CN); Ling Huang, Xiamen (CN); Chao Chen, Xiamen (CN); Wuxi Zhu, Xiamen (CN)

(73) Assignee: Xiamen King Long United Automotive Industry Co., Ltd., Xiamen (CN)

( * ) Notice: Subject to any disclaimer, the term of this patent is extended or adjusted under 35 U.S.C. 154(b) by 70 days.

(21) Appl. No.: 16/918,223

(22) Filed: Jul. 1, 2020

(65) Prior Publication Data

US 2021/0046922 A1 Feb. 18, 2021

(30) Foreign Application Priority Data

Aug. 14, 2019 (CN) .......................... 201910750704.3

(51) Int. Cl.
*B60W 30/045* (2012.01)
*B60W 40/068* (2012.01)
(Continued)

(52) U.S. Cl.
CPC ........ *B60W 30/045* (2013.01); *B60W 40/068* (2013.01); *B60W 40/101* (2013.01);
(Continued)

(58) Field of Classification Search
CPC ............. B60W 30/045; B60W 40/068; B60W 40/101; B60W 40/107; B60W 40/109;
(Continued)

(56) References Cited

U.S. PATENT DOCUMENTS 9,751,533 B2 * 9/2017 Singh ...................... B60C 23/20
2015/0284021 A1 * 10/2015 Singh .................. B60T 8/17552
701/41
(Continued)

*Primary Examiner* — Scott A Reinbold
(74) *Attorney, Agent, or Firm* — Bayramoglu Law Offices LLC

(57) ABSTRACT

A yaw motion control method for a four-wheel distributed vehicle includes: calculating the steering response of the vehicle in a steady state using a nonlinear vehicle model in reference with an understeering degree while constraining by the limit value of the road surface adhesion condition according to the sideslip angle response and the vertical load change in the steady state, calculating the lateral force response and the self-aligning moment response of the tires in the steady state by a magic tire formula, calculating the required additional yaw moment by using the yaw motion balance equation, reasonably distributing the generalized control force to the four drive motors through the optimization algorithm in combination with the current driving conditions; finally, off-line storing and retrieving the calculation results of the off-line distribution of different vehicle parameters required by different upper layers to distribute the torques to the four drive wheels.

7 Claims, 4 Drawing Sheets

(51) Int. Cl.
*B60W 40/101* (2012.01)
*B60W 40/107* (2012.01)
*B60W 40/109* (2012.01)
*B60W 40/114* (2012.01)
*B60W 40/072* (2012.01)

(52) U.S. Cl.
CPC ........ *B60W 40/107* (2013.01); *B60W 40/109* (2013.01); *B60W 40/114* (2013.01); *B60W 40/072* (2013.01); *B60W 2510/20* (2013.01); *B60W 2540/10* (2013.01)

(58) Field of Classification Search
CPC ............. B60W 40/114; B60W 40/072; B60W 2510/20; B60W 2540/10; B60W 2050/0012; B60W 2050/0034; B60W 40/12; B60W 2040/1307; B60W 2050/0031; B60W 2050/0052; B60W 2720/403; B60W 2720/406; B60W 40/103; Y02T 10/72; B60L 15/20; B60L 15/32; B60L 2220/42; B60L 2240/12; B60L 2240/16; B60L 2240/18; B60L 2240/24; B60L 2240/423; B60L 2240/64
USPC ............................................. 701/69; 710/69
See application file for complete search history.

(56) References Cited

U.S. PATENT DOCUMENTS

2016/0264135 A1* 9/2016 Yamakado ............ B60W 10/18
2020/0406969 A1* 12/2020 Ersal ............... B60W 30/18163

* cited by examiner

YAW MOTION CONTROL METHOD FOR FOUR-WHEEL DISTRIBUTED VEHICLE

CROSS REFERENCE TO THE RELATED APPLICATIONS

This application is based upon and claims priority to Chinese Patent Application No. 201910750704.3, filed on Aug. 14, 2019, the entire contents of which are incorporated herein by reference.

TECHNICAL FIELD

The present invention relates to the field of vehicle control technologies, and more particularly, to a yaw motion control method for a four-wheel distributed vehicle.

BACKGROUND

In the normal driving process of the traditional center-driven pure electric vehicle, the left and right drive wheels thereof maintain a state of differential speed and equal torque through a differential. This working state is controlled according to the road surface condition and cannot be changed forcibly by the vehicle control unit (VCU), thereby posing insufficient control on the travel of the vehicle. In the distributed driving vehicles, especially those equipped with four-wheel-drive system, each drive wheel can be controlled independently, which significantly enhances steering control and overall handling of the vehicle. Therefore, it is highly desirable to coordinate the four drive motors according to the driving conditions to maintain the yaw stability of the vehicle, especially in the steering process.

SUMMARY

The present invention provides a yaw motion control method for a four-wheel distributed vehicle to solve the above-mentioned problems of the prior art.

In order to solve the above-mentioned technical problems, the present invention adopts the following technical solutions.

A yaw motion control method for a four-wheel distributed vehicle adopts hierarchical control. An upper layer of the hierarchical control is a motion tracking layer. The method specifically includes the following steps: (1) performing white noise filtering processing on original data collected by a sensor through a vehicle control unit (VCU); (2) based on a magic formula tire model, constructing a generalized Luenberger observer, and estimating a sideslip angle $\beta$ of a center of mass combined with an integral algorithm; (3) calculating a lateral force $F_y$ and a self-aligning moment $M_z$ of the vehicle in a steady state by a magic formula according to an estimation result of the sideslip angle $\beta$ of the center of mass; (4) calculating a vertical load $F_z$ of four drive wheels based on a lateral acceleration $a_y$ and a longitudinal acceleration $a_x$; (5) calculating a feedforward yaw moment $M_{FF}$ under different steering wheel angles $\delta_f$, velocities $V_x$, and road surface adhesion coefficients $\mu$ in the steady state by adopting a two-track two-degree-of-freedom nonlinear vehicle model in reference with an ideal understeering degree (US); (6) according to a limit value of an adhesion coefficient of a current road surface, obtaining an ideal yaw velocity under a condition of the current road surface, using sliding-mode control based on an anti-integral saturation to make a yaw velocity of the vehicle track a reference yaw velocity, and calculating a feedback yaw moment $M_{FB}$ to obtain a total expected yaw moment $\Delta M_z = M_{FF} + M_{FB}$.

The above yaw motion control method further includes the following steps: (7) obtaining an output torque map of the vehicle under different throttle openings and velocities by offline calculation, and obtaining an expected longitudinal driving torque $T_{req}$ of the vehicle by interpolating the throttle openings and the velocities according to an operation intention of a driver; (8) a lower layer of the hierarchical control being an actuator control layer, distributing the expected yaw moment $\Delta M_z$ and the expected longitudinal driving torque $T_{req}$, distributing a generalized driving force to four drive motors using an optimization algorithm corresponding to different driving conditions; (9) off-line storing and retrieving a calculation result of an off-line distribution of different vehicle parameters required by different upper layers to control yaw motion of the vehicle.

Specifically, in step (2), the sideslip angle $\beta$ of the center of mass is estimated by the following formula:

$$\beta = \frac{1}{\tau \cdot s + 1}\beta_{model} + \frac{\tau s}{\tau \cdot s + 1}\beta_{kin} = \frac{1}{\tau \cdot s + 1}\beta_{model} + \frac{\tau s}{\tau \cdot s + 1} \cdot \left(\beta_0 + \int\left(\frac{a_y}{v} - \gamma\right)dt\right)$$

where, $\beta_{model}$ represents an estimated value of the sideslip angle of the center of mass obtained by the observer; $\beta_{kin}$ represents an estimated value of the sideslip angle of the center of mass obtained by an integration method; $\beta_0$ represents an initial value of the sideslip angle of the center of mass obtained by the integration method; $v$ represents a longitudinal velocity of the four-wheel distributed vehicle; $s$ represents a Laplace operator; $a_y$ represents the lateral acceleration of the four-wheel distributed vehicle; $\gamma$ represents a yaw velocity of the four-wheel distributed vehicle; and $\tau$ represents a time constant.

Specifically, in step (5), a dynamic equation of the vehicle model is expressed as follows:

$$F_{yf}(\alpha_f)\cos(\delta_f) + F_{yr}(\alpha_r) + F_{xf}\sin(\delta_f) = Ma_y = Mv_x(\dot{\beta}+\gamma),$$

$$F_{yf}\cos(\delta_f)l_f - F_{yr}l_r + F_{xf}\sin(\delta_f)l_f + M_z(\alpha) + M_z(F_d) + M_z(F_{yf}\delta_f) + \Delta M_z = I_z\dot{\gamma}$$

where, $\gamma$ represents the yaw velocity of the four-wheel distributed vehicle; $I_z$ represents a moment of inertia of the vehicle around z axis; $M_z(F_d)$ represents a yaw moment caused by load transfer due to a rolling resistance of a left drive wheel and a right drive wheel of the four drive wheels; $M_z(F_{yf}\delta_f)$ represents a yaw moment between the four drive wheels caused by a front-axle lateral force due to a front wheel steering angle; $M_z(\alpha)$ represents a equivalent self-aligning moment; $\Delta M_z$ represents a additional yaw moment; $l_f$ represents a distance from the front axle to the center of mass; $l_r$ represents a distance from the rear axle to the center of mass; $M$ represents a mass of the four-wheel distributed vehicle; $a_y$ represents a lateral acceleration of the four-wheel distributed vehicle; $\beta$ represents a sideslip angle of the center of mass of the four-wheel distributed vehicle; $\delta_f$ represents a steering wheel angle; $v_x$ represents a longitudinal velocity of the four-wheel distributed vehicle; $F_{yf}$ represents a front axle equivalent lateral force; $F_{yr}$ represents a rear axle equivalent lateral force; $F_{xf}$ represents a front axle equivalent longitudinal force; $F_{xr}$ represents a rear axle equivalent longitudinal force.

Specifically, a feedback yaw moment of a motion tracking after adding the anti-integral saturation is expressed as follows:

$$M_{FB} = -k_{p,M} sat\left(\frac{S}{\theta}\right),$$

$k_{p,M}$ represents a convergence rate, S represents a motion tracking error, θ represents a thickness of a boundary layer of the anti-integral saturation.

Specifically, in step (8), when the vehicle is driving in a straight line, the driving force is distributed to maximize a total efficiency of the four drive motors, and when the vehicle is turning, the driving force is distributed to minimize a total road surface adhesion utilization of the tires.

Specifically, when the total efficiency of the four drive motors is optimized to be maximized, a ratio $K_{eco}$ of an output torque of a front motor to an output torque of a rear motor is determined by the following formula to maximize the total efficiency of output torques of the four motors based on a premise of meeting an acceleration demand:

$$\max\eta = \frac{1}{\frac{K_{eco}}{\eta_f\left(\frac{K_{eco} \cdot T_{req}}{2}, n_f\right)} + \frac{1-K_{eco}}{\eta_r\left(\frac{(1-K_{eco}) \cdot T_{req}}{2}, n_r\right)}},$$

$$\eta_f\left(\frac{K_{eco} \cdot T_{req}}{2}, n_f\right)$$

represents an efficiency of the front-axle motor, $$\eta_r\left(\frac{(1-K_{eco}) \cdot T_{req}}{2}, n_r\right)$$

represents an efficiency of the rear-axle motor, $T_{req}$ is a total demand torque, $n_f$ represents a speed of the front-axle motor, $n_r$ represents a speed of the rear-axle motor.

Specifically, when the road surface adhesion utilization of the four drive wheels is optimized to be minimized, an optimization and a constraint are expressed in the form of 2-norm by the following formulas using a least square programming sequence:

$$u_c = \underset{\Omega}{\arg\min} \|W_u u_c\|_2$$

$$\Omega = \arg \min_{\underline{u}_c \le u_c \le \overline{u}_c} \|W_v(Bu_c - v)\|_2,$$

$u_c$ is a longitudinal force matrix acting on each drive wheel of the four drive wheels, v is a generalized control force matrix, B is a coefficient matrix, $W_u$ and $W_v$ are weight matrices, and Ω is a feasible region.

From the above description of the present invention, compared with the prior art, the present invention has the following advantages.

The present invention adopts the two-track two-degree-of-freedom nonlinear vehicle model in reference with the understeering degree to calculate the steering response of the vehicle in a steady state. Meanwhile, with constraints by the limit value of the road surface adhesion condition, according to the sideslip angle response and the vertical load change in the steady state, the lateral force response and the self-aligning moment response of the tires in the steady state are calculated by the magic tire formula. Then, the required additional yaw moment is calculated by the yaw motion balance equation. The lower layer of the hierarchical control is the actuator control layer, and the generalized control force is reasonably distributed to the four drive motors through the optimization algorithm in combination with the current driving conditions. Finally, the calculation results of the off-line distribution of different vehicle parameters required by different upper layers are off-line stored and retrieved to control the yaw motion of the vehicle and ensure the driving stability.

DETAILED DESCRIPTION OF THE EMBODIMENTS

The specific embodiment of the present invention is described hereinafter with reference to the drawings.

Figure 1:
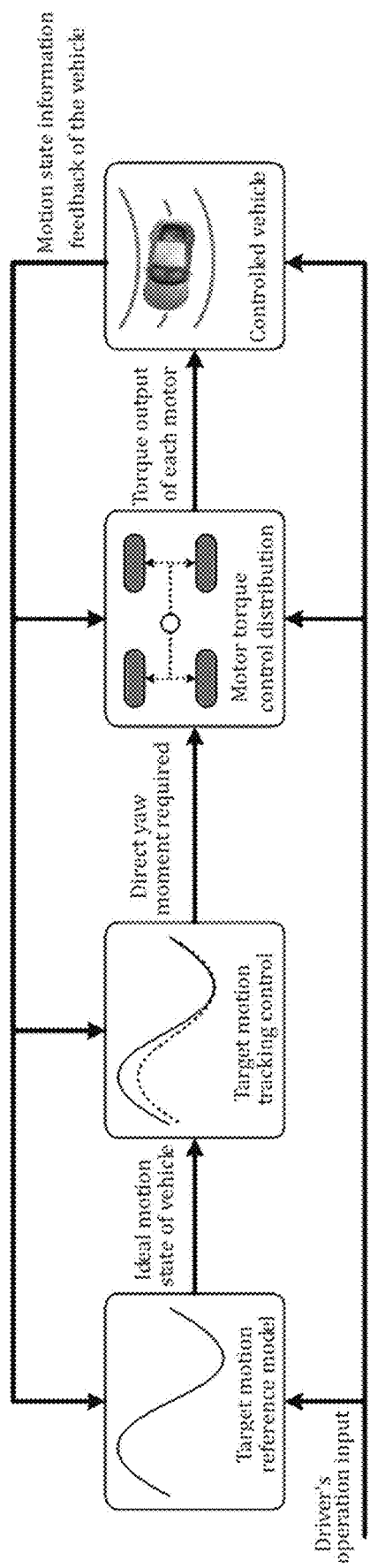
FIG. 1 is a schematic diagram showing the principle of the control system of the present invention.
Figure 2:
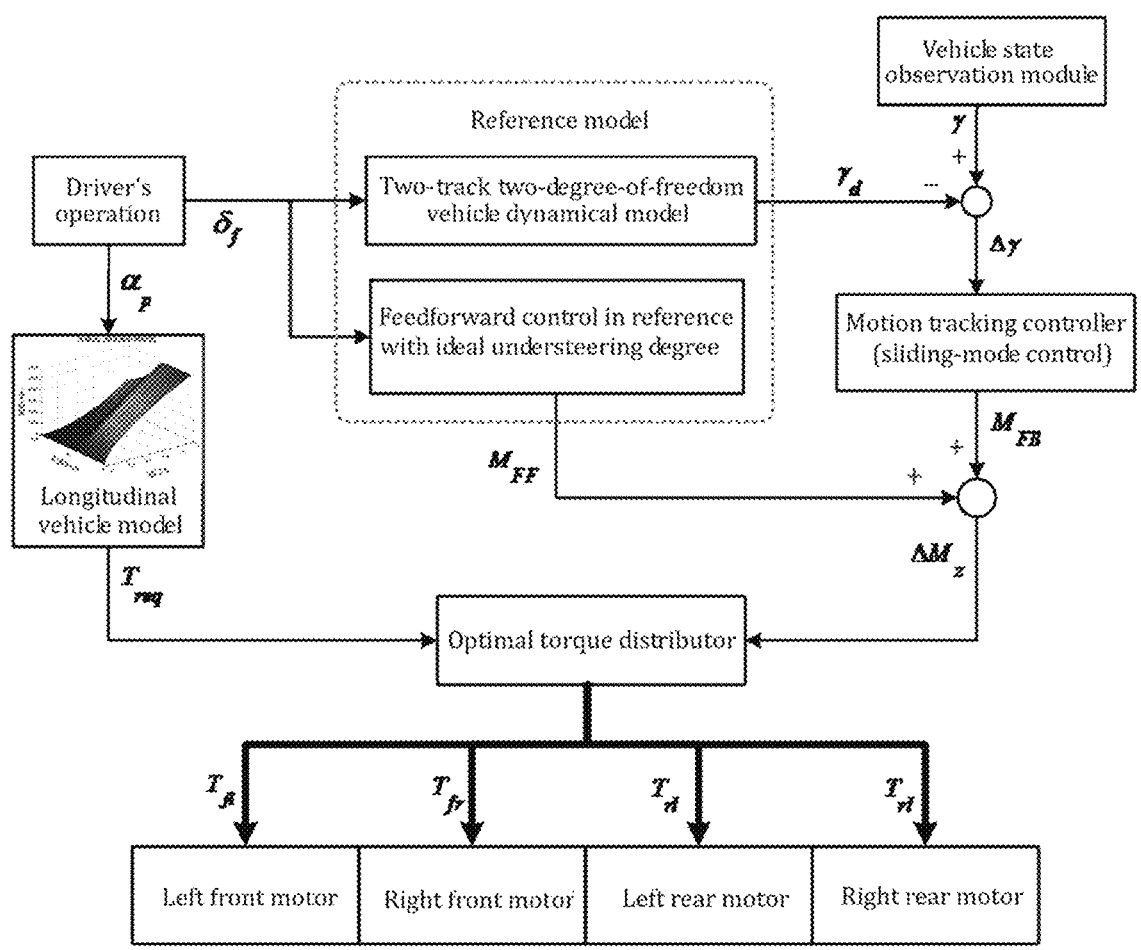
FIG. 2 is a logic diagram of the hierarchical control of the present invention.

As shown in FIGS. 1-2, the present invention adopts the method of hierarchical control to design a torque vector control algorithm for a distributed driving electric vehicle. The hierarchical control can effectively solve the relationship between vehicle dynamics and tire dynamics in vehicle handling stability control. Specifically, the control system includes two control layers. The upper layer of the control system is the motion tracking layer and adopts the feedforward control based on the front wheel steering angle and the tracking control algorithm based on the motion model. The generalized control force (generally including the direct yaw moment and the longitudinal acceleration demand) is calculated according to the input signal (such as acceleration pedal travel, steering wheel angle, etc.) of the driver, the feedback of the current state of the vehicle, the ideal state of the reference vehicle model and other information. The lower layer of the control system is the actuator control layer for distributing the generalized control force input to each wheel, and the wheel side motor torque is controlled to obtain different tire longitudinal forces, so as to control the yaw moment of the vehicle.

A yaw motion control method for a four-wheel distributed vehicle includes the following steps.

(1) The vehicle control unit (VCU) performs the white noise filtering processing on the original data collected by the sensor. The above original data include a steering wheel angle signal of a steering wheel angle sensor, acceleration of a vehicle attitude sensor, a yaw velocity signal, and a speed signal of a wheel speed sensor.

(2) Based on the magic formula tire model, the generalized Luenberger observer is constructed, and the sideslip angle β of the center of mass is estimated combined with the integral algorithm.

Specifically, the magic formula is described as follows:

$$\begin{cases} Y(x) = y(x) + S_V \\ y(x) = D\sin\{C \arctan[Bx - E(Bx - \arctan(Bx))]\} \\ x = X + S_H \end{cases}$$

where, Y(x) represents a tire force acting on the tire from the ground, such as the longitudinal force $F_x$, the lateral force $F_y$, or the self-aligning moment $M_z$, and when Y(x) is used to represent different tire forces, the corresponding model parameters are different and need to be adjusted accordingly; the independent variable X represents the sideslip angle or the longitudinal slip rate of the tire, the coefficient B represents a stiffness factor, the coefficient C represents a curve shape factor, the coefficient D represents a peak factor, the coefficient E represents a curve curvature factor; $S_H$ and $S_V$ represent a horizontal offset and a vertical offset of the origin of the fitted curve of the tire force, respectively; y(x) represents the fitted curve of the tire force.

The Luenberger observer is described as follows:

$$\dot{\hat{x}} = f(\hat{x}, u) + L(\hat{x}, u) \cdot (y - \hat{y})$$

$$\hat{y} = h(\hat{x}, u)$$

wherein, $$f(\hat{x}, u) = A\hat{x} + Bu$$

$$h(\hat{x}, u) = \gamma$$

where, $f(\hat{x}, u)$ represents a state function, $h(\hat{x}, u)$ represents an observation function, $L(\hat{x}, u)$ represents a gain function of the observer, A represents a state matrix, B represents an input matrix, u represents an input variable, herein, u represents the front wheel steering angle.

The sideslip angle of the center of mass is estimated by the integration method expressed as follows:

$$\dot{\beta} = \frac{a_y}{v} - \gamma$$

where, $\alpha_y$ represents the lateral acceleration of the vehicle body, and $\gamma$ represents the yaw velocity of the vehicle body.

Both sides of the above formula are integrated to obtain the following formula:

$$\beta = \beta_0 + \int \left(\frac{a_y}{v} - \gamma\right) dt$$

An integral reset mechanism is set to solve the problem of error accumulation of the integration method. When the vehicle keeps driving in a straight line for a long time, the integration method is reset to reduce the accumulative error. According to the steering wheel angle signal, the integral is reset when the steering wheel angle is maintained within ±10° for more than 5 s.

The model method and the integration method are combined by the following formula. In the low-frequency range, the estimation result based on the dynamics method plays an important role in the final estimation results. In this case, the estimation result is robust to the sensor biased error and the road lateral slope. In the high-frequency response stage, the estimation results based on the kinematic method play an important role. In this case, the estimation result is robust to the model error, and the estimation of the dynamic change of the sideslip angle of the center of mass is more accurate. Therefore, the robustness of the fusion estimation method to the sensor biased error and the model error is enhanced. Besides, the fusion estimation method uses all the frequencies of the signal and thus produces the estimation result with relatively small phase lag.

$$\beta = \frac{1}{\tau \cdot s + 1}\beta_{model} + \frac{\tau s}{\tau \cdot s + 1}\beta_{kin} =$$
$$\frac{1}{\tau \cdot s + 1}\beta_{model} + \frac{\tau s}{\tau \cdot s + 1} \cdot \left(\beta_0 + \int \left(\frac{a_y}{v} - \gamma\right) dt\right)$$

where, $\beta_{model}$ represents the estimated value of the sideslip angle of the center of mass obtained by the observer; $\beta_{kin}$ represents the estimated value of the sideslip angle of the center of mass obtained by the integration method; $\beta_0$ represents an initial value of the sideslip angle of the center of mass obtained by the integration method; v represents a longitudinal velocity of the four-wheel distributed vehicle; s represents a Laplace operator; $a_y$ represents the lateral acceleration of the four-wheel distributed vehicle; $\gamma$ represents the yaw velocity of the four-wheel distributed vehicle; and $\tau$ represents the time constant.

(3) The lateral force $F_y$ and the self-aligning moment $M_z$ of the vehicle in the steady state are calculated by the magic formula according to the estimation result of the sideslip angle of the center of mass.

Different tire specifications have different coefficient values in the above magic formula, and the calculation formula of the lateral force and the calculation formula of the self-aligning moment of the tires can be obtained as follows.

The calculation formula of the lateral force of the tires is expressed as follows:

$$\begin{cases} F_y = D_y \sin\{C_y \arctan[B_y x - E_y(B_y x - \arctan B_y x)]\} + S_V \\ x = \alpha + S_h \\ C_y = a_0 \\ D_y = (a_1 F_Z + a_2) F_Z \\ B_y C_y D_y = a_3 \sin(a_4 \arctan(a_5 F_Z))(1 - a_{12}|\gamma|) \\ B_y = B_y C_y D_y / C_y D_y \\ E_y = a_6 F_Z^2 + a_7 F_Z + a_8 \\ S_h = a_9 \gamma \\ S_V = (a_{10} F_Z^2 + a_{11} F_Z) \gamma \end{cases},$$

where, $\gamma$ represents the wheel camber angle, and $a_0, a_1, \ldots, a_{12}$ represent fitting coefficients. The wheel camber angle indicates the angle between the wheel plane and the vertical axis of the vehicle coordinate axis. In the ideal case, the influence of the wheel camber angle and the drift is not considered, that is, the tire side angle $\gamma$ is 0, and $S_h$ and $S_v$ are both 0.

The calculation formula of the self-aligning moment is expressed as follows:

$$\begin{cases} M_z = D_z \sin\{C_z \arctan[B_z x - E_z(B_z x - \arctan B_z x)]\} + S_V \\ x = \alpha + S_h \\ C_z = c_0 \\ D_z = (c_1 F_z + c_2) F_z \\ B_z C_z D_z = (c_3 F_z^2 + c_4 F_z)(1 - c_6|\gamma|)e^{-c_5 F_z} \\ B_z = B_z C_z D_z / C_z D_z \\ E_z = (c_7 F_z^2 + c_8 F_z + c_9)(1 - c_{10}|\gamma|) \\ S_h = c_{11} \gamma + c_{12} F_z + c_{13} \\ S_V = (c_{14} F_z^2 + c_{15} F_z) \gamma + c_{16} F_z + c_{17} \end{cases},$$

where, $\gamma$ represents the wheel camber angle, and $c_0, c_1, \ldots, c_{17}$ represent fitting coefficients.

(4) The vertical load $F_z$ of the four drive wheels is calculated based on the lateral acceleration $a_y$ and the longitudinal acceleration $a_x$. Specifically, the calculation formula of the vertical load is expressed as follows:

$$\begin{cases} F_{zfl} = \frac{mgl_r}{2l} - \frac{ma_x h_g}{2l} - \frac{ma_y h_g l_r}{b_f l} \\ F_{zfr} = \frac{mgl_r}{2l} - \frac{ma_x h_g}{2l} + \frac{ma_y h_g l_r}{b_f l} \\ F_{zrl} = \frac{mgl_f}{2l} + \frac{ma_x h_g}{2l} - \frac{ma_y h_g l_f}{b_r l} \\ F_{zrr} = \frac{mgl_f}{2l} + \frac{ma_x h_g}{2l} + \frac{ma_y h_g l_f}{b_r l} \end{cases}$$

where, m represents the mass of the vehicle; $l$, $l_r$, and $l_f$ represent the wheelbase, the distance from the rear axle to the center of mass, and the distance from the front axle to the center of mass, respectively; $h_g$ represents the height of the center of mass; and $a_x$ and $a_y$ represent the longitudinal acceleration and the lateral acceleration of the vehicle, respectively.

(5) The two-track two-degree-of-freedom nonlinear vehicle model is adopted in reference with the ideal understeering degree US, the feedforward yaw moment $M_{FF}$ under different steering wheel angles $\delta_f$, velocities $V_x$ and road surface adhesion coefficients $\mu$ is calculated in the steady state.

Figure 3:
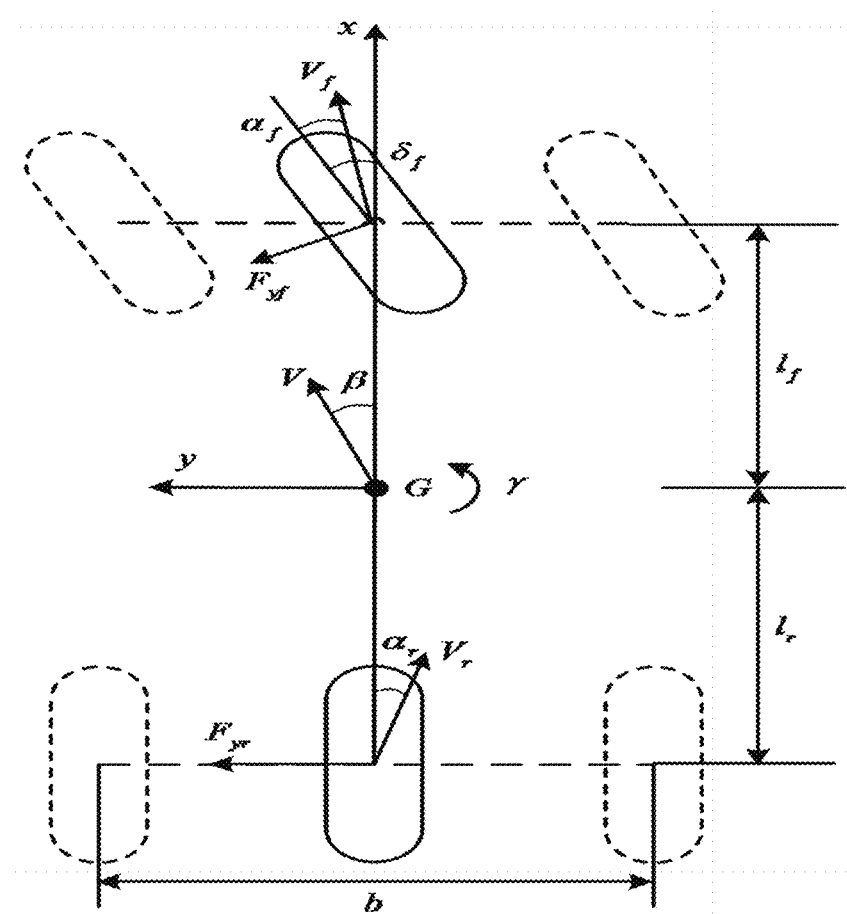
FIG. 3 is a schematic diagram showing the dynamics model of the vehicle.

Referring to FIG. 3, in order to study the handling stability of the vehicle, it is considered that the vehicle only executes the planar motion parallel to the ground in the two-degree-of-freedom vehicle model. In this case, the forward velocity of the vehicle is constant, and the vehicle has two degrees of freedom, i.e. the yaw velocity and the sideslip angle of the center of mass. The control strategy is designed to make the actual vehicle follow the reference model to move as much as possible.

In order to design the control strategy, the above model is further simplified by considering the inner and outer wheels to have the same tire cornering characteristics to obtain the following dynamic equations of the vehicle model.

$$F_{yf}(\alpha_f)\cos(\delta_f) + F_{yr}(\alpha_r) + F_{xf}\sin(\delta_f) = Ma_y = Mv_x(\dot\beta + \gamma) \quad (1.1)$$

$$F_{yf}\cos(\delta_f)l_f + F_{yr}l_r + F_{xf}\sin(\delta_f)l_f + M_z(\alpha) + M_z(F_d) + M_z(F_{yf}\delta_f) + \Delta M_{z0} = I_z\dot\gamma \quad (1.2)$$

wherein, $$F_{xf} = \frac{1}{2}\left(\frac{C_d v_x^2}{21.15} + F_{yf}\sin(\delta_f)\right)\tan(\delta_f)$$

$$M_Z(F_d) = (F_{zl} - F_{zr}) \cdot (0.0065 + 0.00001 \cdot v_x) \cdot \frac{b}{2}$$

$$M_z(F_{yf}\delta_f) = \frac{F_{yf}(F_{zfl} - F_{zfr})}{F_{zf}}\sin(\delta_f) \cdot \frac{b}{2}$$

$$M_z(\alpha) = M_{zf}(\alpha_f) + M_{zr}(\alpha_r),$$

where, $F_{xf}$ represents the equivalent longitudinal force of the front axle; $I_z$ represents a moment of inertia of the vehicle around z axis; $M_{zf}(\alpha_f)$ represents the equivalent self-aligning moment of the front axle; $M_{zr}(\alpha_r)$ represents the equivalent self-aligning moment of the rear axle; $M_z(F_d)$ represents the yaw moment caused by load transfer due to the rolling resistance of the left and right wheels; $M_z(F_{yf}\delta_f)$ represents the yaw moment between the wheels caused by the lateral force of the front axle due to the front wheel steering angle; and $\Delta M_{z0}$ represents the total additional yaw moment; $l_f$ represents a distance from the front axle to the center of mass; $l_r$ represents a distance from the rear axle to the center of mass; M represents a mass of the four-wheel distributed vehicle; $a_y$ represents a lateral acceleration of the four-wheel distributed vehicle; β represents a sideslip angle of the center of mass of the four-wheel distributed vehicle; $\delta_f$ represents a steering wheel angle; $v_x$ represents a longitudinal velocity of the four-wheel distributed vehicle; $F_{yf}$ represents a front axle equivalent lateral force; $F_{yr}$ represents a rear axle equivalent lateral force; $F_{xf}$ represents a front axle equivalent longitudinal force; $F_{xr}$ represents a rear axle equivalent longitudinal force.

The ideal understeering degree of the vehicle is expressed as follows:

$$US = \frac{|\alpha_f| - |\alpha_r|}{|a_y|} = C|a_y| \quad (1.3)$$

where, $\alpha_f$ represents the equivalent sideslip angle of the front axle, $\alpha_r$ represents the equivalent sideslip angle of the rear axle, and $a_y$ represents the lateral acceleration of the vehicle.

The sideslip angles of the front and rear axles are respectively expressed by the following formulas:

$$\alpha_f = \beta + \frac{l_f \gamma}{v_x} - \delta_f \quad (1.4)$$

$$\alpha_r = \beta - \frac{l_r \gamma}{v_x}. \quad (1.5)$$

Then, the expression of the understeering degree is obtained as follows:

$$US = \left|\frac{\frac{l\gamma}{v_x} - \delta_f}{a_y}\right| = Ca_y. \quad (1.6)$$

The reference lateral acceleration under the input of different front wheel steering angles and velocities is calculated by equation (1.6):

$$a_{yref} = \frac{\sqrt{\left(\frac{l}{V^2}\right)^2 + 4C\delta_f} - \frac{l}{V^2}}{2C} \cdot \text{sgn}(\delta_f). \quad (1.7)$$

Therefore, the difference between the sideslip angles of the front axle and the rear axle of the vehicle is as follows:

$$|\alpha_{fref} - \alpha_{rref}| = C \cdot a_{yref}^2 \quad (1.8)$$

The reference sideslip angle $\alpha_{fref}$ of the front axle and the reference sideslip angle $\alpha_{rref}$ of the rear axle of the vehicle are obtained by simultaneously solving the above equations (1.1), (1.7) and (1.8). Then the reference sideslip angle $\alpha_{fref}$ of the front axle and the reference sideslip angle $\alpha_{rref}$ of the rear axle are substituted into the above equation (1.2). In the steady state $I_z\dot\gamma=0$, the feedforward yaw moment $M_{FF}=\Delta M_{Z0}$ under different steering wheel angles, velocities and road surface adhesion coefficients is obtained.

(6) The ideal yaw velocity under the condition of the current road surface is obtained according to the limit value of the adhesion coefficient of the current road surface. The sliding-mode control based on the anti-integral saturation is adopted to make the yaw velocity of the vehicle track the reference yaw velocity, and the feedback yaw moment $M_{FB}$ is calculated and obtained, then the total expected yaw moment is $\Delta M_z = M_{FF} + M_{FB}$.

Specifically, the relatively small sideslip angle of the center of mass under normal driving conditions is ignored in consideration of the constraint ($a_y < \mu g$) of the condition of the road surface, and the ideal yaw velocity under the constraint of the condition of the road surface is obtained as follows according to the two-degree-of-freedom vehicle model.

$$\gamma_{d,ref} = \frac{a_{yref}}{V}, |a_{yref}| \leq i_s \mu g$$

In order to improve the robustness of the error feedback control of the yaw velocity to the modeling error and external disturbance, the present invention adopts the sliding-mode control to make the vehicle yaw velocity track the reference yaw velocity.

The motion tracking error is expressed as follows:

$$s = \gamma_e = \gamma - \gamma_d.$$

In order to reach the reference state quickly, the present invention employs the equal rate reaching law expressed as follows:

$$\dot{s} = k \, \text{sgn}(s),$$

where, k>0 and is a constant, and indicates the rate of approaching the sliding-mode surface. As k increases, the rate of approaching the sliding-mode surface increases.

Therefore, the additional yaw moment applied is expressed as follows:

$$M_{FB} = -I_z \dot{\gamma} = -I_z \cdot k \, \text{sgn}(s) = -k_{p,M} \text{sgn}(\gamma_e),$$

where, $k_{p,M}$ represents the convergence rate and is generally designed to be large enough within an allowable range of the control capability to allow the error to converge quickly.

The sliding-mode control has the disadvantage of the control signal jitter caused by the discontinuous characteristic near the sliding-mode surface, which affects the control effect.

In order to eliminate the jitter of the sliding-mode controller, the symbolic function is generally replaced with the saturation function to design the control law, so as to obtain the continuous sliding-mode control law. Therefore, in the present invention, the additional yaw moment is converted into the following formula:

$$M_{FB} = -k_{p,M} \cdot sat\left(\frac{\gamma_e}{\theta}\right), sat\left(\frac{\gamma_e}{\theta}\right) = \begin{cases} \frac{\gamma_e}{\theta}, |\gamma_e| < \theta \\ \text{sgn}(\gamma_e), |\gamma_e| > \theta \end{cases}$$

where, $\theta$>0 and represents the thickness of the boundary layer of the saturation function. Too large $\theta$ causes instability, and too small $\theta$ causes jitter.

The saturation function is adopted to eliminate the jitter, but produces a tracking error at the same time. The sliding-mode integral control can improve the response in the boundary layer and reduce the error. In addition, the sliding-mode controller based on the anti-integral saturation is designed in consideration of the integral saturation.

The error variable is reselected as follows:

$$s = \gamma_e + k_{i,M} \sigma = \gamma - \gamma_d + k_{i,M} \sigma,$$

where, $k_{i,M}$ represents the control coefficient of the error integral and is a positive constant; $\sigma$ represents an intermediate variable designed by the controller and is defined as follows:

$$\dot{\sigma} = -k_{i,M} \sigma + \theta sat\left(\frac{s}{\theta}\right), \text{ and } |\sigma(0)| \leq \theta/k_{i,M}$$

Therefore, the feedback yaw moment of motion tracking after adding the anti-integral saturation is expressed as follows:

$$M_{FB} = -k_{p,M} \cdot sat\left(\frac{S}{\theta}\right),$$

$k_{p,M}$ represents a convergence rate, S represents a motion tracking error, $\theta$ represents a thickness of a boundary layer of the anti-integral saturation.

(7) The output torque map of the vehicle under different throttle openings and velocities is obtained by offline calculation. The expected longitudinal driving torque $T_{req}$ of the vehicle is obtained by interpolating the throttle openings and the velocities according to the operation intention of the driver.

Figure 4:
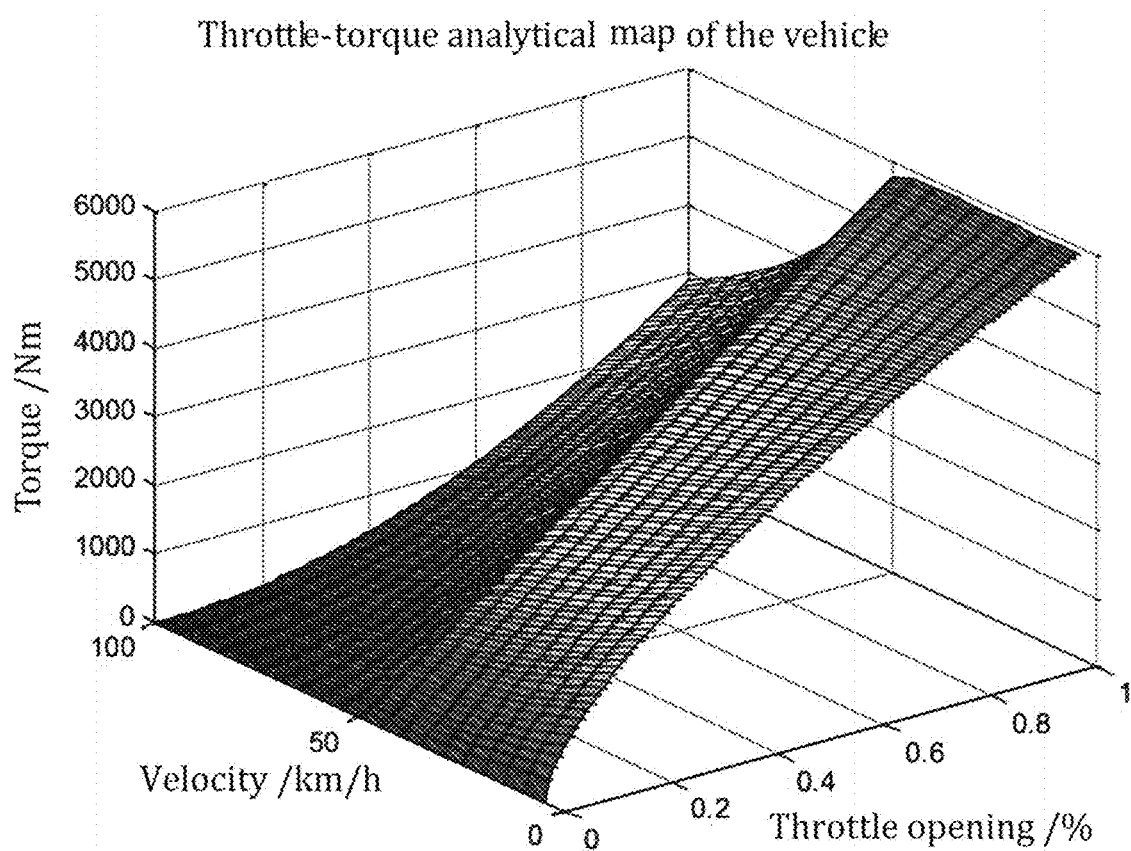
FIG. 4 is a throttle-torque analytical map of the vehicle.

As shown in FIG. 4, specifically, the throttle-torque analytical map of the vehicle is obtained by the offline calculation. The table is retrieved according to the throttle opening input by the driver and the current longitudinal velocity of the vehicle, and the expected longitudinal driving torque $T_{req}$ of the vehicle is output.

(8) The total expected yaw moment $\Delta M_z$ and the expected longitudinal driving torque $T_{req}$ obtained from the upper layer are distributed. According to different driving conditions, the corresponding optimization algorithm is adopted to distribute the generalized driving force to the four drive motors.

Specifically, when the vehicle is driving in a straight line, the driving force is distributed based on the goal of maximizing the total efficiency of the four drive motors. When the vehicle is turning, the driving force is distributed based on the goal of minimizing the total road surface adhesion utilization of the tires.

More specifically, (a) the optimal torque distribution based on the economic model is as follows.

The optimal torque distribution based on the economic model is to determine the ratio $K_{eco}$ of the output torque of the front motor and the output torque of the rear motor according to the current state of the vehicle by the following formula, to maximize the total efficiency of output torques of the four motors based on the premise of meeting the acceleration demand:

$$\max \eta = \frac{1}{\frac{K_{eco}}{\eta_f\left(\frac{K_{eco} \cdot T_{req}}{2}, n_f\right)} + \frac{1 - K_{eco}}{\eta_r\left(\frac{(1 - K_{eco}) \cdot T_{req}}{2}, n_r\right)}},$$

$$\eta_f\left(\frac{K_{eco} \cdot T_{req}}{2}, n_f\right)$$

represents an efficiency of the front-axle motor, $$\eta_r\left(\frac{(1-K_{eco}) \cdot T_{req}}{2}, n_r\right)$$

represents an efficiency of the rear-axle motor, $T_{req}$ is a total demand torque, $n_f$ represents a speed of the front-axle motor, $n_r$ represents a speed of the rear-axle motor.

In the control mode of the optimal torque distribution based on the economic model, the vehicle tends to execute the linear motion or the steering motion under an input of a relatively small steering wheel angle, and in this case, the additional yaw moment required by the vehicle is relatively small. Therefore, after the acceleration demand of the vehicle is satisfied in advance, the yaw moment of the vehicle is directly realized through the differential torques of the left and right wheels of the rear axle, which reduces the change of steering wheel assist characteristics caused by the differential yaw moment of the front axle.

(b) The optimal torque distribution based on the goal of minimizing the utilization of the tires is as follows.

The generalized control force required for the vehicle handling stability control is expressed as follows:

$$F=[F_{x,d}\Delta M_z]^T.$$

The control variable is the longitudinal forces acting on each wheel, and expressed as follows:

$$u_c=[F_{x,fl}F_{x,fr}F_{x,rl}F_{x,rr}]^T.$$

According to the vehicle model, the following formulas are obtained:

$$F = B \cdot u_c$$

$$B = \begin{bmatrix} \cos\delta_f & \cos\delta_f & 1 & 1 \\ -\frac{b_f}{2}\cos\delta_f + l_f\sin\delta_f & \frac{b_f}{2}\cos\delta_f + l_f\sin\delta_f & -\frac{b_r}{2} & \frac{b_r}{2} \end{bmatrix}$$

The constraints of the longitudinal force of each wheel caused by the external characteristics and the response rate of the motor and the road surface are expressed as follows:

$$-\frac{T_{max}}{r} \le F_{x,k} \le \frac{T_{max}}{r}$$

$$-\frac{dT}{r} \le \Delta F_{x,k} \le \frac{dT}{r}$$

$$-\sqrt{(\mu F_{z,k})^2 - F_{y,k}^2} \le F_{x,k} \le \sqrt{(\mu F_{z,k})^2 - F_{y,k}^2},$$

where, k=fl, fr, rl, and rr represents the left front wheel, the right front wheel, the left rear wheel and the right rear wheel, respectively; $T_{max}$ represents the maximum torque provided by the motor at the current velocity, and dT represents the maximum difference between the torques of the motor in one control cycle. In the road surface adhesion constraint, the road surface adhesion coefficient of each wheel is obtained by on-line parameter identification, and the vertical load of each wheel can be estimated by the longitudinal acceleration and the lateral acceleration.

The road surface adhesion utilization of the four drive wheels is optimized to be minimized by the following formula:

$$\min J = \Sigma \frac{F_{x,i}^2}{(\mu_i F_{z,i})^2}.$$

The optimization and the constraint are expressed in the form of 2-norm by the following formulas using the least square programming sequence:

$$u_c = \arg\min_{\Omega}\|W_u u_c\|_2$$

$$\Omega = \arg\min_{\underline{u}_c \le u_c \le \overline{u}_c}\|W_v(Bu_c - v)\|_2,$$

$u_c$ is a longitudinal force matrix acting on each drive wheel of the four drive wheels, v is a generalized control force matrix, B is a coefficient matrix, $W_u$ and $W_v$ are weight matrices, and $\Omega$ is a feasible region.

(9) The calculation results of the off-line distribution of different vehicle parameters required by different upper layers are off-line stored and retrieved to control the yaw motion of the vehicle. The vehicle parameters include the mass, the position of the center of mass and the road surface adhesion coefficient.

In summary, the present invention adopts the two-track two-degree-of-freedom nonlinear vehicle model in reference with the understeering degree to calculate the steering response of the vehicle in a steady state. Meanwhile, with constraints by the limit value of the road surface adhesion condition, according to the sideslip angle response and the vertical load change in the steady state, the lateral force response and the self-aligning moment response of the tires in the steady state are calculated by the magic tire formula. Then, the additional yaw moment required is calculated by the yaw motion balance equation. The lower layer of the hierarchical control is the actuator control layer, the generalized control force is reasonably distributed to the four drive motors through the optimization algorithm in combination with the current driving conditions. Finally, the calculation results of the off-line distribution of different vehicle parameters required by different upper layers are stored off-line and retrieved to control the yaw motion of the vehicle and ensure the driving stability.

The above is only a specific embodiment of the present invention, but the design concept of the present invention is not limited to this specific embodiment. Any non-substantive modifications to the present invention based on this concept shall belong to an infringement of the scope of protection of the present invention.

What is claimed is:

1. A yaw motion control method for a four-wheel distributed vehicle, wherein the yaw motion control method adopts a hierarchical control architecture, an upper layer of the hierarchical control architecture is a motion tracking layer; the yaw motion control method specifically comprises the following steps:

step 1): collecting original data wherein the original data includes a steering wheel angle signal of a steering wheel angle sensor, acceleration of a vehicle attitude sensor, a yaw velocity signal, and a speed signal of a wheel speed sensor wherein the original data is collected by a sensor through a vehicle control unit (VCU);

step 2): performing a white noise filtering processing on the original data;

step 3): based on a magic formula tire model, estimating a sideslip angle β of a center of mass combined with an integral algorithm;

step 4): calculating a lateral force $F_y$ and a self-aligning moment $M_z$ of the four-wheel distributed vehicle in a steady state by a magic formula according to an estimation result of the sideslip angle β of the center of mass;

step 5): calculating a vertical load $F_z$ of four drive wheels based on a lateral acceleration $a_y$ and a longitudinal acceleration $a_x$;

step 6): calculating a feedforward yaw moment $M_{FF}$ under different steering wheel angles $\delta_f$, different velocities $V_x$ and different road surface adhesion coefficients μ in the steady state by adopting a two-track two-degree-of-freedom nonlinear vehicle model in reference with an ideal understeering degree US;

step 7): according to a limit value of an adhesion coefficient of a current road surface, obtaining an ideal yaw velocity under a condition of the current road surface, using sliding-mode control based on an anti-integral saturation to make a yaw velocity of the four-wheel distributed vehicle track a reference yaw velocity, and calculating a feedback yaw moment $M_{FB}$ to obtain a total expected yaw moment $\Delta M_z = M_{FF} + M_{FB}$;

step 8): obtaining an output torque map of the four-wheel distributed vehicle under different throttle openings and different velocities by offline calculation, and obtaining an expected longitudinal driving torque $T_{req}$ of the four-wheel distributed vehicle by interpolating the different throttle openings and the different velocities according to an operation of a driver;

step 9): distributing the total expected yaw moment $\Delta M_Z$ and the expected longitudinal driving torque $T_{req}$, distributing a generalized driving force to four drive motors using an optimization algorithm corresponding to different driving conditions, wherein a lower layer of the hierarchical control architecture is an actuator control layer;

step 10): off-line storing and retrieving a calculation result of an off-line distribution of different vehicle parameters required by different upper layers to control a yaw motion of the four-wheel distributed vehicle; and step 11): driving the four drive motors based on the yaw motion control method of steps 1) through 10).

2. The yaw motion control method for the four-wheel distributed vehicle according to claim 1, wherein, in step 3), the sideslip angle β of the center of mass is estimated by the following formula:

$$\beta = \frac{1}{\tau \cdot s + 1}\beta_{model} + \frac{\tau s}{\tau \cdot s + 1}\beta_{kin} =$$
$$\frac{1}{\tau \cdot s + 1}\beta_{model} + \frac{\tau s}{\tau \cdot s + 1}\cdot\left(\beta_0 + \int\left(\frac{a_y}{v} - \gamma\right)dt\right)$$

where, $\beta_{model}$ represents an estimated value of the sideslip angle of the center of mass obtained by the observer; $\beta_{kin}$ represents an estimated value of the sideslip angle of the center of mass obtained by an integration method; $\beta_0$ represents an initial value of the sideslip angle of the center of mass obtained by the integration method; v represents a longitudinal velocity of the four-wheel distributed vehicle; s represents a Laplace operator; $a_y$ represents the lateral acceleration of the four-wheel distributed vehicle; γ represents a yaw velocity of the four-wheel distributed vehicle; and τ represents a time constant.

3. The yaw motion control method for the four-wheel distributed vehicle according to claim 1, wherein, in step 6), a dynamic equation of the two-track two-degree-of-freedom nonlinear vehicle model is expressed as follows:

$$F_{yf}(\alpha_f)\cos(\delta_f)+F_{yr}(\alpha_r)+F_{xf}\sin(\delta_f)=Ma_y=Mv_x(\dot{\beta}+\gamma),$$

$$F_{yf}\cos(\delta_f)l_f-F_{yr}l_r+F_{xf}\sin(\delta_f)l_f+M_z(\alpha)+M_z(F_d)+M_z(F_{yf}\delta_f)+\Delta M_z=I_z\dot{\gamma}$$

where, γ represents the yaw velocity of the four-wheel distributed vehicle; $I_z$ represents a moment of inertia of the vehicle around z axis; $M_z(F_d)$ represents a yaw moment caused by load transfer due to a rolling resistance of a left drive wheel and a right drive wheel of the four drive wheels; $M_z(F_{yf}\delta_f)$ represents a yaw moment between the four drive wheels caused by a front-axle lateral force due to a front wheel steering angle; $M_z(\alpha)$ represents a equivalent self-aligning moment; $\Delta M_z$ represents a additional yaw moment; $l_f$ represents a distance from the front axle to the center of mass; $l_r$ represents a distance from the rear axle to the center of mass; M represents a mass of the four-wheel distributed vehicle; $\alpha_y$ represents a lateral acceleration of the four-wheel distributed vehicle; β represents a sideslip angle of the center of mass of the four-wheel distributed vehicle; $\delta_f$ represents a steering wheel angle; $v_x$ represents a longitudinal velocity of the four-wheel distributed vehicle; $F_{yf}$ represents a front axle equivalent lateral force; $F_{yr}$ represents a rear axle equivalent lateral force; $F_{xf}$ represents a front axle equivalent longitudinal force; $F_{xr}$ represents a rear axle equivalent longitudinal force.

4. The yaw motion control method for the four-wheel distributed vehicle according to claim 1, wherein, the feedback yaw moment of a motion tracking after adding the anti-integral saturation is expressed as follows:

$$M_{FB} = -k_{p,M}sat\left(\frac{S}{\theta}\right),$$

$k_{p,M}$ represents a convergence rate, S represents a motion tracking error, θ represents a thickness of a boundary layer of the anti-integral saturation.

5. The yaw motion control method for the four-wheel distributed vehicle according to claim 1, wherein, in step 9), when the four-wheel distributed vehicle is driving in a straight line, the generalized driving force is distributed to maximize a total efficiency of the four drive motors, and when the four-wheel distributed vehicle is turning, the generalized driving force is distributed to minimize a total road surface adhesion utilization of the four drive wheels.

6. The yaw motion control method for the four-wheel distributed vehicle according to claim 5, wherein, when the total efficiency of the four drive motors is optimized to be maximized, a ratio $K_{eco}$ of an output torque of a front-axle motor of the four drive motors to an output torque of a rear-axle motor of the four drive motors is determined by the following formula to maximize the total efficiency of output torques of the four motors based on a premise of meeting an acceleration demand, wherein $T_{req}$ represents the expected longitudinal driving torque:

$$\max \eta = \cfrac{1}{\cfrac{K_{eco}}{\eta_f\left(\cfrac{K_{eco} \cdot T_{req}}{2}, n_f\right)} + \cfrac{1 - K_{eco}}{\eta_r\left(\cfrac{(1 - K_{eco}) \cdot T_{req}}{2}, n_r\right)}},$$

$$\eta_f\left(\frac{K_{eco} \cdot T_{req}}{2}, n_f\right)$$

represents an efficiency of the front-axle motor, $$\eta_r\left(\frac{(1 - K_{eco}) \cdot T_{req}}{2}, n_r\right)$$

represents an efficiency of the rear-axle motor, $T_{req}$ is a total demand torque, $n_f$ represents a speed of the front-axle motor, $n_r$ represents a speed of the rear-axle motor.

7. The yaw motion control method for the four-wheel distributed vehicle according to claim 5, wherein, when the total road surface adhesion utilization of the four drive wheels is optimized to be minimized, an optimization and a constraint are expressed in the form of 2-norm by the following formulas using a least square programming sequence:

$$u_c = \underset{\Omega}{\arg\min} \|W_u u_c\|_2$$

$$\Omega = \arg \underset{u_c \leq u_c \leq \overline{u}_c}{\min} \|W_v(Bu_c - v)\|_2,$$

$u_c$ is a longitudinal force matrix acting on each drive wheel of the four drive wheels, v is a generalized control force matrix, β is a coefficient matrix, $W_u$ and $W_v$ are weight matrices, and Ω is a feasible region.

\* \* \* \* \*